US 7,620,734 B2

(12) United States Patent
Freudenthal

(10) Patent No.: US 7,620,734 B2
(45) Date of Patent: Nov. 17, 2009

(54) SYSTEM AND METHOD FOR DISTRIBUTING FOVEATED DATA IN A NETWORK

(75) Inventor: Eric Freudenthal, Hastings on Hudson, NY (US)

(73) Assignee: New York University, New York, NY (US)

( * ) Notice: Subject to any disclaimer, the term of this patent is extended or adjusted under 35 U.S.C. 154(b) by 915 days.

(21) Appl. No.: 10/476,864

(22) PCT Filed: May 23, 2002

(86) PCT No.: PCT/US02/16454

§ 371 (c)(1),
(2), (4) Date: May 10, 2004

(87) PCT Pub. No.: WO02/095608

PCT Pub. Date: Nov. 28, 2002

(65) Prior Publication Data

US 2004/0215716 A1 Oct. 28, 2004

Related U.S. Application Data

(60) Provisional application No. 60/293,084, filed on May 23, 2001.

(51) Int. Cl.
*G06F 15/167* (2006.01)
(52) U.S. Cl. .................. 709/246; 709/214; 709/216
(58) Field of Classification Search .............. 709/214, 709/216, 246
See application file for complete search history.

(56) References Cited

U.S. PATENT DOCUMENTS

| 6,167,438 | A  | 12/2000 | Yates et al. |
| 6,182,114 | B1 | 1/2001  | Yap et al.   |
| 6,185,625 | B1 | 2/2001  | Tso et al.   |
| 6,314,452 | B1 | 11/2001 | Dekel et al. |
| 6,356,283 | B1 | 3/2002  | Guedalia     |

OTHER PUBLICATIONS

John Schermann et al., 3D Foveated Visualization on the Web, Proceedings of SPIE—vol. 4311 Internet Imaging II, Dec. 2000, pp. 349-360.*

(Continued)

*Primary Examiner*—Patrice Winder
(74) *Attorney, Agent, or Firm*—Dorsey & Whitney LLP

(57) ABSTRACT

A system and method for executing a computer program in a network. The system includes a surrogate proxy processor which, when executing the computer program, is programmed to receive at least one foveated image from at least one of the foveating proxy server and a further device that is connected to the foveating proxy server, wherein the foveating proxy server generates the at least one foveated image, and transmit the foveated image to at least one of the client computer and a another device. In addition, a system is provided which includes a foveating proxy server, and at least two surrogate proxy servers communicating with one another. At least one of the at least two surrogate proxy servers communicates with the foveating proxy server, and another one of the at least two proxy servers communicates with at least one of the client computer and a further device, wherein the at least two surrogate proxy servers are cascaded along a multi-hop portion of the network.

53 Claims, 8 Drawing Sheets

OTHER PUBLICATIONS

D. Santa Cruz et al., Region of Interest coding JPEG2000 for interactive client/server applications, 1999 IEEE 3$^{rd}$ Workshop on Multimedia Signal Processing, Sep. 1999, pp. 389-394.*

Swarup Acharya et al. "Systematic Multiresolution and its Application to the World Wide Web," Proceedings of the International Conference on Data Engineering, Sydney, Australia, pp. 1-10, Mar. 1999.

Antonio Ortega et al. "Soft Caching: Web Cache Managment Techniques for Images," Single Processing Society 199 Workshop on Multimedia Single Processing, Princeton, New Jersey, Jun. 23-25, 1997.

* cited by examiner

SYSTEM AND METHOD FOR DISTRIBUTING FOVEATED DATA IN A NETWORK

CROSS-REFERENCE TO RELATED APPLICATION(S)

This application is a national stage application of PCT Application No. PCT/US02/16454 which was filed on May 23, 2002, and published on Nov. 28, 2002 as International Publication No. WO 02/095608 A1 (the "International Application"). This application also claims priority from U. S. Provisional Application No. 60/293,084 filed May 23, 2001. The disclosures of these applications are incorporated herein by reference in their entireties.

FIELD OF THE INVENTION

The present invention relates to methods and systems for distributing foveated data packages in a network utilizing a surrogate proxy server. More particularly, this invention relates to methods and systems which transmit images generated by a foveating proxy server, including very large images, over a "thinwire" (e.g., communication arrangements and wires serving the Internet or any other network or application having bandwidth limitations) using a surrogate proxy server.

BACKGROUND OF THE INVENTION

The Internet enables clients or users access to information in ways never before possible over existing communications lines. Often, the client may desire to view and have access to relatively large images. For example, a client/viewer may wish to explore a map of a particular geographic location. The entire map, at highest (i.e., full) level of resolution will likely require a pixel representation to be provided on the display of the viewer that is beyond the size of the viewer screen in the highest resolution mode.

One conventional way to address this limitation is for an Internet server to pre-compute many smaller images of the original image. The smaller images may have a lower resolution (i.e., zoomed-out) views and/or portions of the original image. Most conventional image archive systems use this approach, which is less than optimal since no preselected set of views can anticipate the needs of all users.

Some conventional map engines (see, e.g., URLs http://www.mapquest.com and http://www.MapOnUs.com) use an approach in which the user may zoom and pan over a large image. However, the transmission over the Internet involves significant bandwidth limitations (i.e., the transmission is relatively slow). Therefore, a method and system which allows a realtime visualization of large scale images over a "thinwire" model of computation is needed. In particular, it is desirable to optimize the model which includes an image server and a client viewer connected to one another by a low bandwidth line.

One approach to obtain and utilize multifoveated images in a "thinwire" environment which overcomes the above deficiencies is described in U.S. Pat. No. 6,182,114 entitled "Apparatus and Method for Realtime Visualization Using User-Defined Dynamic, Multi-Foveated Images". The entire disclosure of this U.S. patent is incorporated herein by reference. This approach provides an effective real-time visualization over a "thin wire" with precision and flexibility, and allows the user to modify the position and shape of the basic foveal regions, the maximum resolution at the foveal region and the rate at which the resolution falls away. In this manner, the "thinwire" model can be optimized. Furthermore, this approach provides for the use of the multifoveated images that can be dynamically (or incrementally) updated as a function of user input. This property is useful for solving the thinwire problem, since it is beneficial for the information to be "streamed" at the rate that optimally matches the bandwidth of the network with the human capacity to absorb the visual information. Thus, dynamic foveation-based rendering (e.g., which transmits image details on demand) can dramatically reduce bandwidth requirements for swift and responsive viewing of the remote documents.

Conventional web servers and other electronic document servers generally do not support foveation. Consequently, the images that are downloaded from these conventional servers tend to travel very slowly over the low-bandwidth links.

A proxy document (e.g., web) server or foveating document server can automatically convert images contained within those pages into the foveated format. The foveating proxy server then transmits the foveated images to a client computer's electronic document viewer (e.g., web browser), and displays the converted pages with the foveated image, instead of the original static images. The foveated images are rendered in a manner that is appropriate for a foveal viewing, whereby the initial low-resolution images are displayed as they are received, and higher-resolution "foveas" are requested, received and updated in response to user input.

However, low-bandwidth communications can still present a significant slow-down for transmission of the images, especially the images embedded within the electronic documents.

SUMMARY OF THE INVENTION

One of the objects of the present invention is to allow a realtime visualization of large scale images over a "thinwire" model of computation.

The present invention overcomes the disadvantages of prior art methods and systems by utilizing a foveating system that transmits one or more dynamic multifoveated images (i.e., a variable resolution image) from a foveating proxy server to a client computer or viewer via one or more surrogate proxy servers. In this manner, a client computer is able to request only those portions of an image that the user of the client computer desires to view rather than having to download the entire image. Accordingly, the foveated images can be transmitted to be rendered by the client computer in a manner appropriate for foveal viewing. Specifically, low-resolution images are initially sent to be viewed by the client computer as they are received. Thereafter, higher resolution portions of the original image can be sent in response to the user's request(s) and can be displayed by the client computer as an update to the displayed image. Nevertheless, the system according to the invention can be provided to transmit an entire image at once or as a sequence of foveated images. In addition, the invention can provide that only images and portions of images that are specifically requested are sent and that the original images can compressed or enhanced by the system. It can also be provided to automatically update a low-resolution image received by the client computer with more relevant, higher resolution portions.

Multiple web browsers may reside on the same high-speed network, and can reference the same web page via the same auto-foveating proxy. A surrogate proxy server in the browser's network can be provided to minimize the re-transmission of the same image over the low-bandwidth link. When the subsequent web browsers reference the same web page via the same foveating proxy server, the portions that have already been transferred into the cache of the surrogate proxy server download at a very quick rate. For the portions that have not been transferred into the cache, the surrogate proxy server retrieves the foveated images from the foveating proxy server so as to quickly transmit these images to the web browser of the client computer.

The surrogate proxies can be cascaded along multi-hop low-bandwidth networks. In addition, a protocol for the transmission of the foveated documents and images, from the foveating proxy server to the surrogate proxy server, can be provided to multiplex a logical network connection over multiple transactions. Thus, the cost of establishing a surrogate's connection can be amortized, and the network traffic congestion may be further reduced. The user interface component of the present invention may provide a variety of ways for the user to direct this multifoveation process in real time. In context of the present invention, the term "dynamic" can mean that the image resolution is also varying over time.

Thus, the present invention may provide a model which includes an image server and a client viewer connected to one another via a low bandwidth line. In this manner, the bandwidth from the server to the client can be reduced in exchange for a modest increase of the available bandwidth to provide the data and images from the client to the server.

One of the advantages of the present invention is that it can provide a new standard of performance that can be achieved by large-scale image servers on the World Wide Web at the currently used bandwidths, or those bandwidths that may be available in the near future. In addition, the present invention has additional advantages over the traditional forms of the progressive transmission by preferably providing a choice of foveation techniques, e.g., to be used according to the available bandwidth.

Another advantage of the present invention is that the server may transmit only the information which has not yet been received. This has the advantage over the prior art methods and systems in that the communication traffic can be reduced. Another advantage of the system and method according to the present invention is that an improved performance is achieved when they are used in a multi-hop network and/or provided with multiplexing communication protocols.

The surrogate proxy server, when it is provided for the execution of a computer program in a network, includes a foveating proxy server and a client computer. In particular, the surrogate proxy server may include a memory device, a storage device for storing the computer program thereon, as well as a processor. The processor preferably maintains a storage device (e.g., a cache) of at least one foveated image, and receives a request for the foveated image from the client computer. The processor may then request the foveated image if the foveated image is not yet maintained in the storage device, and then receive the foveated image from the foveating proxy server. At such time, the processor can cause the foveated image to be stored in the storage device. Thereafter, the processor can transmit the foveated image to the client computer.

The processor of the surrogate proxy server can receive a request for a data package (e.g., an HTML document) containing at least one image from the client computer, and then request a foveated data package to be provided by a foveating proxy server. When the processor receives the foveated data package from the foveating proxy server, it may transmit the foveated data package to the client computer.

According to one exemplary embodiment of the present invention, when the processor of the surrogate proxy server receives a request for a data package containing at least one image from the client computer, the processor receives such request and rewrites the data package (e.g., to a storage device) as a foveated data package. Then, the surrogate proxy server can transmit the foveated data package to the client computer.

The surrogate proxy server which includes a network protocol processing element can also be provided. In particular, such a network protocol processing element can transmit the foveated data package using a TCP/IP protocol, and may forward the foveated data package to one or more client computers via the Internet. The surrogate proxy server can also execute software programs that determine the capacity of the network connection, to provide the images and/or description to the client computer, and then select an optimal foveating technique to minimize the transmission bandwidth.

It may be preferable to arrange the surrogate proxy server such that the foveating proxy server is situated adjacent to a thinwire portion of the network. Further benefits of the method and system of the present invention can be obtained by providing the processor which communicates with the foveating proxy server according to a multiplexed protocol. In addition, it is beneficial for the foveating system to include a foveating proxy server and at least two surrogate proxy servers cascaded along a multi-hop portion of the network.

Further objects and advantages of the invention will become apparent from a consideration of the drawings, ensuing description, and appended claims.

BREIF DESCRIPTION OF THE DRAWINGS

A more complete understanding of the present invention may be obtained from consideration of the following descriptions, in conjunction with the drawings, of which:

Throughout the figures, the same reference numerals and characters, unless otherwise stated, are used to denote like features, elements, components or portions of the illustrated embodiments.

DETAILED DESCRIPTION OF THE INVENTION

In order to solve the aforementioned problems, methods and systems for distributing data packages are provided as shall be described below in further detail.

Figure 1:
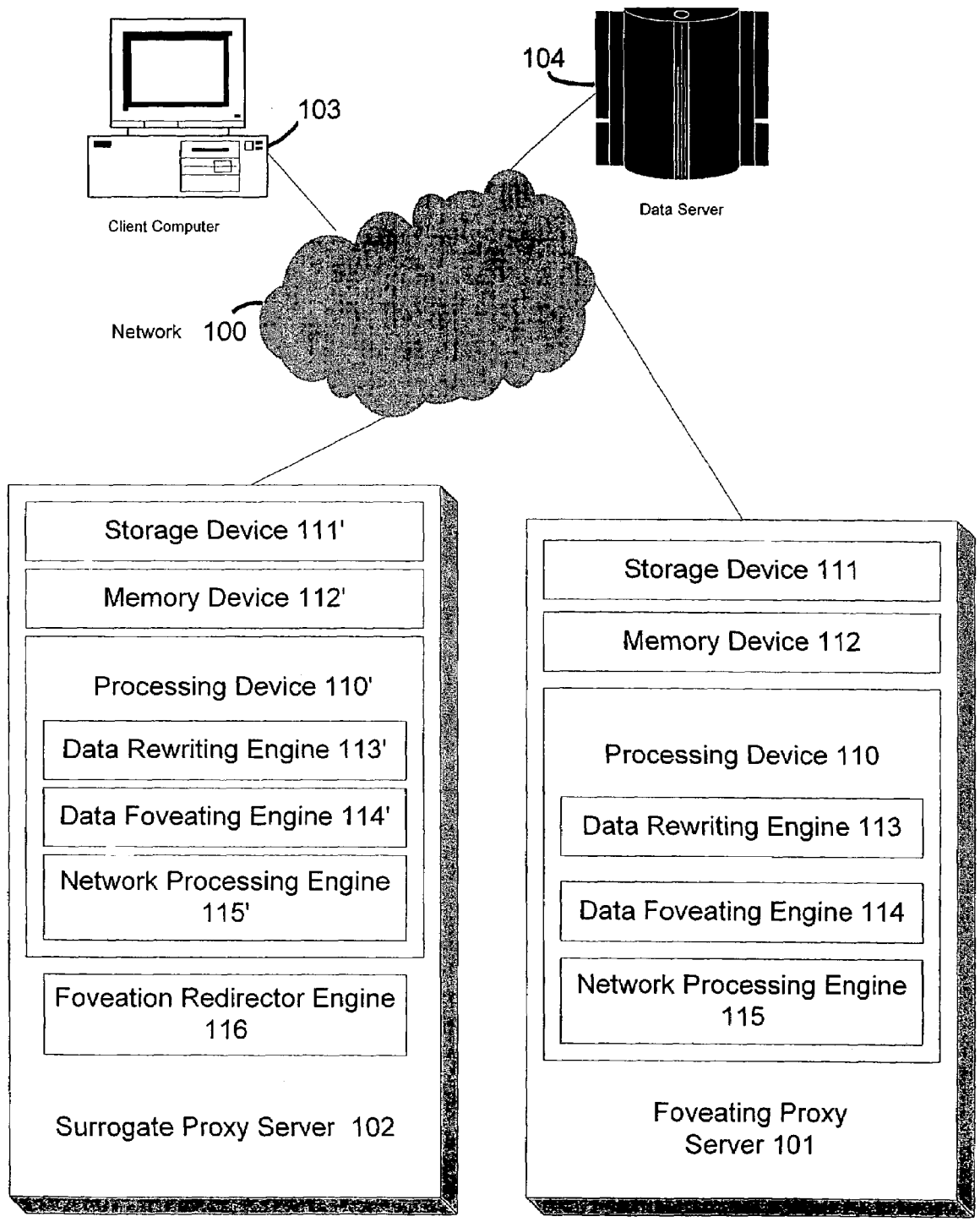
FIG. 1 is an exemplary embodiment of a system according to the present invention, which includes a client computer, a document server, a surrogate proxy server and a foveating proxy server.

FIG. 1 depicts an overview of components in an exemplary embodiment of the system according to the present invention.

In this exemplary system, at least one client computer 103, at least one data server 104, a foveating proxy server 101 and a surrogate proxy server 102 are all interconnected via a network 100. The foveating proxy server 101 includes a storage device 111, a memory device 112 and a computer processing device 110. The storage device 111 can include, for example, an internal hard disk, tape cartridge, CD-ROM, etc., or any combination thereof. It is preferable for the storage device 111 to provide faster access and greater storage capacity. The memory device 112 can be, for example, a collection of RAM chips, ROM devices, FLASH cards, etc.

Figure 2:
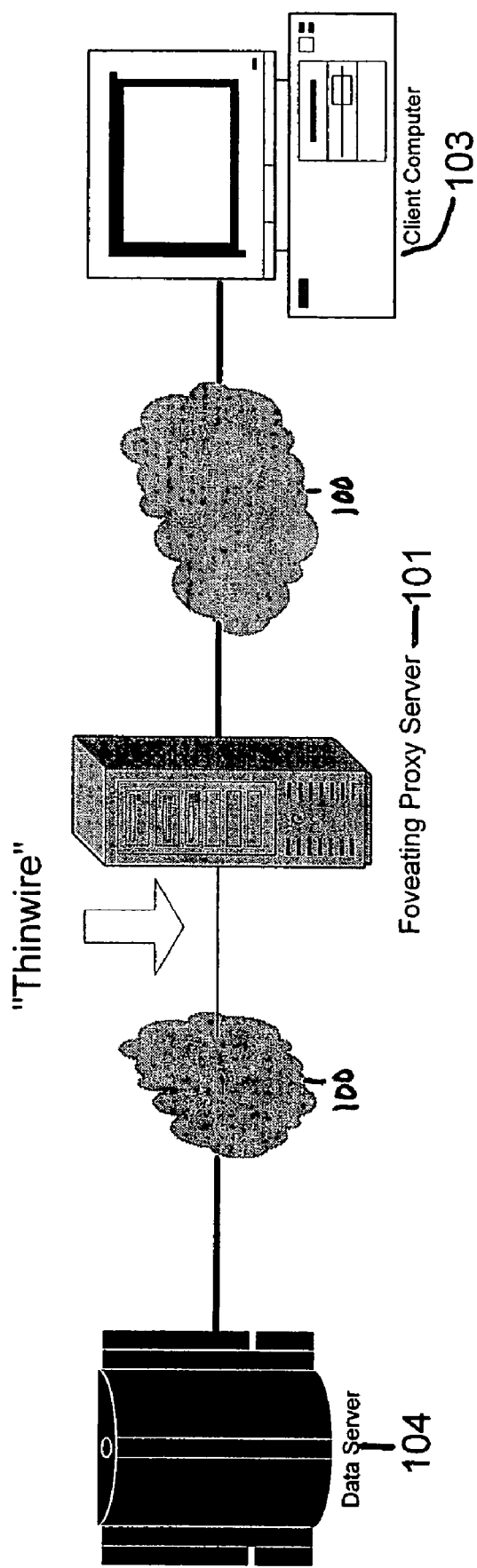
FIG. 2 is the system shown in FIG. 1 provided in a specific thinwire application without a surrogate proxy server being connected thereto.

FIG. 2 shows an exemplary embodiment of the foveating proxy server 101 which transmits images over a low-bandwidth (or thinwire) communication connection. The foveating proxy server 101 is preferably provided on a network where a "thinwire" communication exists between the data server 104 (e.g., a Web server) and the client computer 103. For example, and as shown in FIG. 1, a "thinwire" communication can exist in the networks where high communication rates for carrying large capacity of data traffic (i.e., relative to other portions of the network) between the data server 104 and the client computer 103 are not available.

Turning back to FIG. 1, the processing device 110 of the foveating proxy server 101 includes a network protocol processing element 115 for providing communications between other devices on the network 100. The processing device 110 can be implemented using a single microprocessor chip (e.g., an Intel Pentium chip), printed circuit board having such chip, a plurality of boards with a multiplicity of chips, etc or a combination of each. It is preferable to provide a faster speed capability of the processing device 110. The network protocol processing element 115 can be implemented as a separate "software" module (e.g., a program, sub-process, etc.) whose instructions are executed by the processing device 110. Typical examples of protocols utilized by the network protocol processing element 115 include TCP/IP (the Transmission Central Protocol/Internet Protocol) or UDP (the User Datagram Protocol).

The processing device 110 may also include a data package rewriting engine 113. Alternatively, the data package rewriting engine 113 can be provided separately from the processing device 113, as can be appreciated by one having ordinary skill in the art. The data package rewriting engine 113 is provided for rewriting a data package, such as the HTML document, into a foveated format. In particular, the data package rewriting engine 113 rewrites the data package (such as an HTML source file or document) by replacing references to conventional inlined images (e.g., <img>tags) with references to a foveated image stored at the foveating proxy server. The foveated data package can be a portion of a data package, such as a document or image or portions thereof, that results from the foveation process. The term foveated data package is used interchangeably within for the terms foveated document and foveated image and portions thereof.

Each reference to the foveated image (e.g., a "foveated link") can include appropriate directives for the client computer 103 to start the execution of a foveating renderer, such as an <applet> tag. The foveated link can be provided with arguments so as to encode the identity or address of the foveating proxy server 101 that provide the foveated images and the local alias of the corresponding image. In addition, the foveated link can include information about the identity or location of the foveating renderer, and/or the protocol information specific to the foveation technique (e.g., to specify what resolution of image is requested, the portion of the image requested, etc.). It should be understood that the foveating renderer can be implemented as a Java™ applet, and/or as a plugin for a browser of the client computer 103.

As is known to those having ordinary skill in the art, an "applet" is a program that can be written in Java™ programming language, which may be included in an HTML page in substantially the same manner as the image. When a technology-enabled browser is used to view a page that contains the applet, the applet's code is transferred to the client computer 103, and executed by the client computer's Java™ Virtual Machine (JVM) (i.e., in the case when the Java™ implemented code is utilized). Protocol information can be specific to provide the foveation technique as can be understood by one having ordinary skill in the art.

The processing device 110 includes an image foveation engine 114 which can be used for creating the foveated images based on the images referenced in the data packages (e.g., rewritten as the foveated documents). Alternatively, the image foveation engine 114 can be provided separately from the processing device 110. When a data package is "rewritten" by the rewriting engine 113, the images referenced by the data package are acquired by the foveating proxy server 101 and converted into an internal format that is compatible with foveation. Certain exemplary foveation techniques are described in greater detail in U.S. Pat. No. 6,192,114 to Yap et. al. as described above, and incorporated herein by reference. The foveated images can be stored in the storage 111 device of the foveating proxy server 101.

In one exemplary embodiment of the present invention, the foveated images can be assigned a local alias for identification. A number of schemes can be utilized to generate aliases. In one particular scheme, the conventional image's network address or the universal resource locator ("URL") are embedded in its foveal alias. For example, the foveal alias for a non-foveated image stored at a network address such as "http://host/path," which is to be stored on a server named "server," can be represented as "server/http/host/path". This scheme permits the foveating proxy server 101 to construct the original image's URL from its alias, thereby eliminating the need for the rewriting engine 113 to inform the image foveation engine 114 of the alias prior to performing its functions.

In operation, when the client computer 103 accesses the foveated data package and/or document through the foveating proxy server 191, and seeks to access a foveated image provided as a link on the foveated document, the foveating render installed on the client computer 103 can be invoked. At that time, the foveating renderer establishes a connection with the appropriate foveating proxy server 101 to obtain an image identified by the local alias on the foveated document, and retrieves the foveated image stored at the data server 104. Further related foveated images can be obtained by the client computer 103 depending on the degree of the image foveation provided by the foveating proxy server and the specific foveation technique employed.

In a preferred embodiment of the present invention, the foveating proxy server 101 can be a standard workstation or Pentium based microprocessor system. Also, the TCP/IP processing performed by the devices connected on the network 100 may be used to implement the network protocol processing element 115 because it would likely reduce the complexity of the implementation. Although the TCP/IP implementation is one of the simplest to be used, it is also possible to utilize the UDP protocol, subject to some basic and known design changes. The relative advantage of using the TCP/IP implementation as opposed to the UDP implementation is to be determined empirically. An additional advantage of using these standard network protocols is that the foveating proxy server 101 can be constructed without having any knowledge regarding the construction of the client computer(s) 103. The exemplary embodiment of the present invention may also include an operating system running on the processing device 110 of the foveating proxy server 101 (e.g., Windows 95, Unix, Windows NT, etc).

As indicated above, the foveating proxy server 101 is connected to the client computer 103 and the data server 104 via the network 100. Typical examples of the data server 104 include an image archive server and a map server (e.g., connected to the Internet or the World Wide Web). In addition, if the foveating proxy server 101 is connected to other devices on the network 100 (such as to the client computer 103 or data server 104) via a telephone system line or other communications systems/lines not carrying digital pulses, each of the foveating proxy server 101, the client computer 103 and the data server 104 can also be provided with a communications transceiver device (not shown). This communications transceiver device can convert digital signals generated by the respective device into the frequency/signals carried by the communication line, and may also convert the frequency/signals received from such line into digital pulses, thus allowing the ability to facilitate digital communication.

In addition, a surrogate proxy server 102 can be provided on the network 100. The surrogate proxy server 102 may include a storage device 111', a memory device 112' and a processing device 110'. The processing device 110' of the surrogate proxy server 102 includes a network processing element 115' for communicating with other devices on the network 100. In addition, the surrogate proxy server 102 can include a surrogate redirection engine 116 which can be implemented at the processing device 110' or separately therefrom. The surrogate redirection engine 116 provides a secondary caching proxy to the image foveation engine 114' as well as to rewriting engine of the foveating proxy server 101.

The surrogate proxy server 102 generally acts as a network connection system for the client computer 103 when accessing data packages (such as HTML documents) on the network 100, and can appear to the client computer 103 as a conventional network proxy. Upon request by the client computer 103, the surrogate proxy server 102 can provide requested portions of an image created by a foveation process in lieu of the entire image. The surrogate direction engine 116' can manage the storage of portions of foveated documents and images stored on the storage device 111' of the surrogate proxy server 102. In operation, when the client computer 103 requests the foveated document, the surrogate redirection engine 116' handles (e.g., by proxy) the request for the foveated document or portions of the foveated document if they are stored in the storage device 111' of the surrogate proxy server 102. If the requested foveated document or image is not stored in the storage device 111' of the surrogate proxy server 102, the surrogate proxy server 102 requests this information from the foveating proxy server 101. Similarly, when the client computer 103 requests a non-foveated document, the surrogate proxy server 102 can forward this request to the foveating proxy server 101 for foveation processing. Upon the surrogate proxy server's 102 receipt of a new foveated document or portions of the foveated document, the surrogate proxy server stores this information in the storage device 111'.

In addition, a protocol for the transmission of the foveated documents and images and portions thereof from the foveating proxy server 101 to the surrogate proxy server 102 can be provided via the network 100. This is done to multiplex a logical network connection over multiple transactions, and thus amortize the cost (e.g. systems resources, time delay, etc.) for establishing a surrrogate's connection, and further reduce the congestion of network traffic. It can be appreciated by one having ordinary skill in the art that a single full-duplex link can be multiplexed to implement multiple full-duplex conversations between the foveating proxy server 101 and the surrogate proxy server 102. Each transfer for a conversation between the foveating proxy server 101 and the surrogate proxy server 102, in either direction, can be proceeded by a control message that contains a discriminator to specify each particular conversation. Control messages can also be used to manage the link's lifecycle by, e.g., establishing a new conversation.

Figure 3:
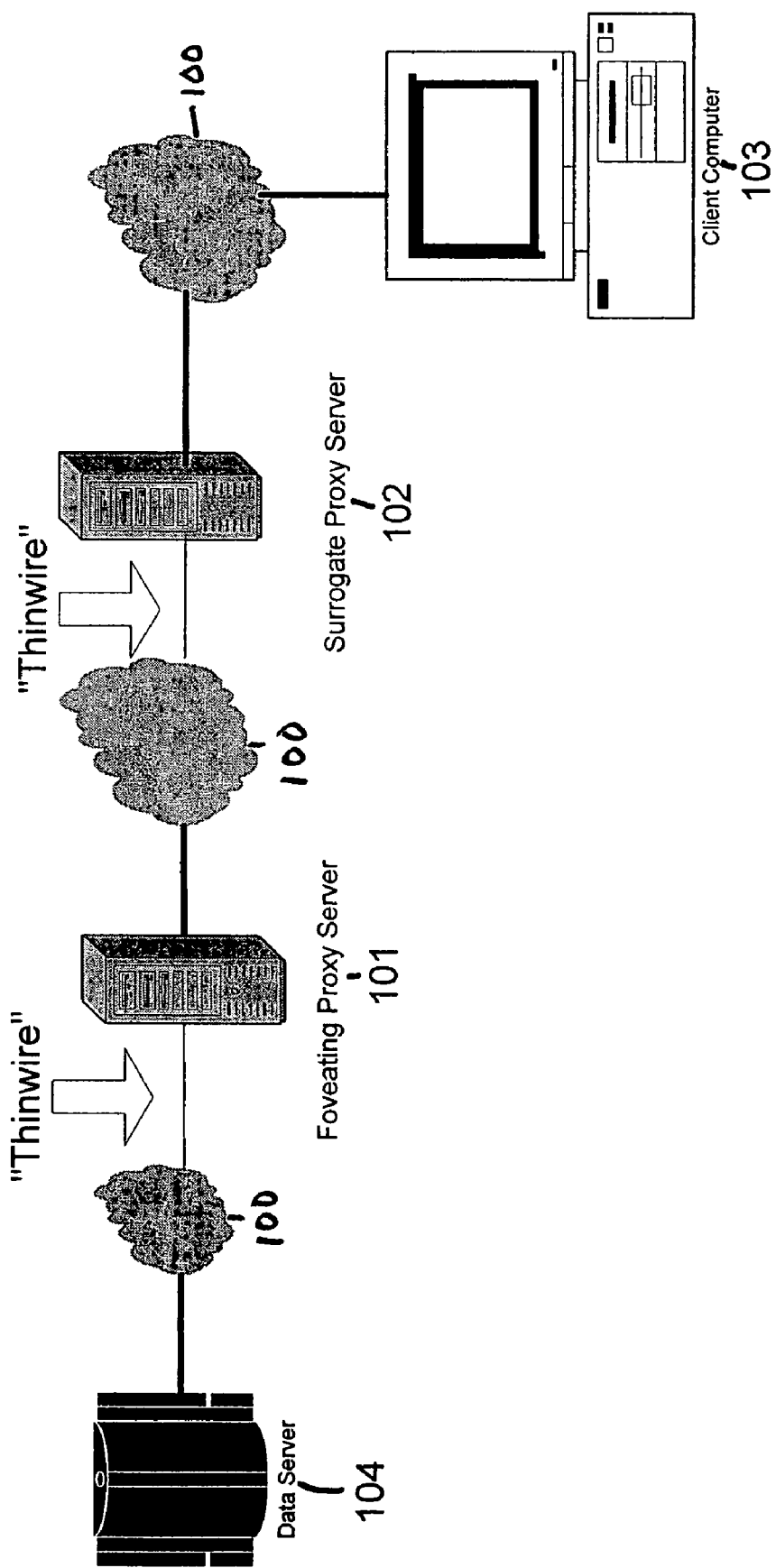
FIG. 3 is the system shown in FIG. 1 provided in a specific thinwire application with the surrogate proxy server being connected thereto.

FIG. 3 shows an example of a communicative connection of the surrogate proxy server 102 and the foveating proxy server 101, which is provided to transmit the images or documents over a low-bandwidth connection. The surrogate proxy server 102 is preferably provided on a network where a "thin-wire" exists between the foveating proxy server 101 and the client computer 103. A separate server can efficiently distribute the images over a portion of the network containing the foveating proxy server 101, and separated from the data server 104 by the thinwire.

In an alternative embodiment of the present invention, the surrogate proxy server 102 can also include a rewriting engine 113' and/or a data foveating engine 114' for handling of the foveation processing of the document or image. This is the case when the network traffic conditions and system processing requirements for the requested foveation (i.e., between the surrogate proxy server 102 and foveating proxy server 101) are such that a local processing by the surrogate proxy server 102 is more efficient than the processing performed by the foveating proxy server 101. The processing resources of the surrogate proxy server 102 may be utilized further when access to cached images and documents is provided in this application. Also, the processing and conversion of the documents into the foveated images and documents is preferably performed by the processing device 110 or the foveating proxy server 101 for greater efficiency.

In another alternative embodiment of the present invention, the processing device 110, 110' of either the surrogate proxy server 102 or the foveating proxy server 101, can be provided using an optimizing software which generates a compact coding such that the lowest resolution base image provides the most useful results, and that subsequent updates of the higher resolution images are efficient. Accordingly, the optimizing software can be provided to dynamically select the appropriate foveating algorithm according to the particular types of data, documents and/or images being transmitted as well as characteristics of the network, such as the bandwidth of a particular link. For example, some images may have sufficiently low information associated therewith, such as a blue rectangle having consistent intensity and color. Accordingly, a non-foveated image can be compressed with conventional compression techniques to provide a full resolution image that is more compact than a foveated image and can thus be transmitted in its entirety. One embodiment of the system can be provided with several compression techniques, including foveation techniques, for compressing the image to be transmitted. After compression of the image using the several techniques, the processing device 110, 110' can make a determination as to which result is optimal and transmit the data according to the chosen technique. Alternatively, the processing device 110, 110' can be provided for receiving a command from the client computer 103, such as a right-click of a mouse button, to retrieve the entire image or document at a particular resolution. Accordingly, the processing device 110, 110' can make a determination as to which technique is optimal for transmission of the data at the requested resolution.

The foveating proxy server 101 can determine an appropriate technique of foveation to be used or an appropriate form of image compression to be applied, if any. For example, the foveating proxy server 101 can provide a throughput analysis of the transmission medium to determine the optimal technique for transmission for a given size of the image to be transmitted. Alternatively, a list of links or network addresses with associated bandwidths can be provided. For example, those connections that are unknown can be designated as slow by default.

Figure 4:
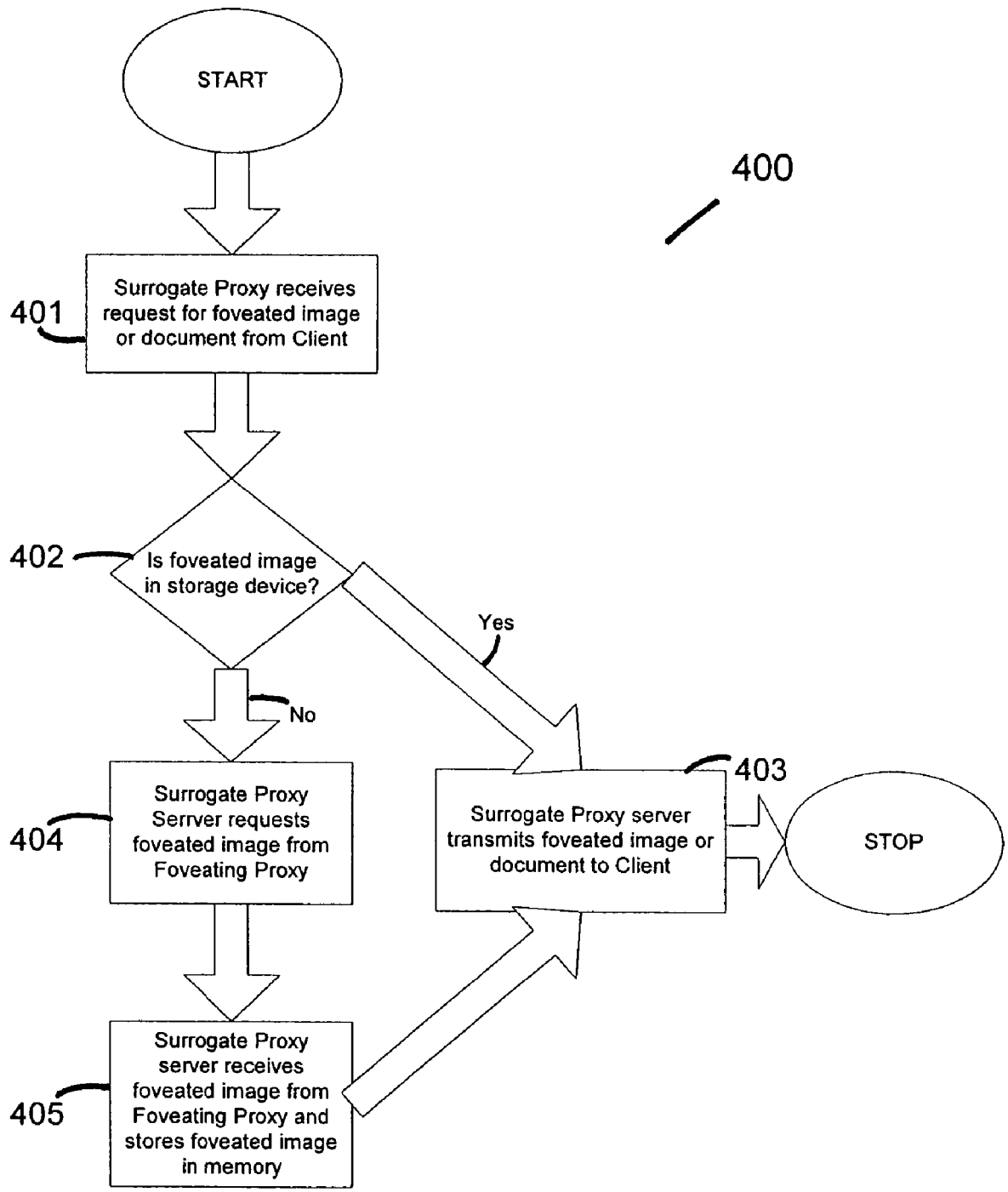
FIG. 4 is a first exemplary flowchart of a method according to the present invention which can be executed by the system of FIG. 1 for distributing foveated data packages.

FIG. 4 illustrates an exemplary flowchart for a method 400 of distributing foveated data packages or documents in a network according to the present invention, which can be executed by the system of FIG. 1. In step 401 of the method, the surrogate proxy server 102 receives a request for a foveated image or document from the client computer 103. As indicated above, the surrogate proxy server 102 can utilize conventional means of transmitting and receiving data on the network 100, and may act as a network proxy for the client computer 103. In step 402, and upon the receipt of the request for the foveated image or document, the foveation redirector engine 116—which manages the foveated documents and images in the storage device 111' of the surrogate proxy server 102—determines whether the storage device 111' has the data associated with the foveated image or document. The foveation redirector engine 116 can employ a conventional database management device for searching the storage device, or it may reference a dynamic file allocation table for the storage device 111'.

If the foveation redirector engine 116 returns a positive result from its search of the storage device 111', in step 403, the surrogate proxy server 102 transmits the foveated document or image to the client computer 103. Conventional transmissions techniques can be employed for the transmission of such data. If the foveation redirector engine 116 returns a negative result from its search of the storage device 111, in step 404, the surrogate proxy server 102 requests the foveated image or document from the foveating proxy server 101. Such request can be a conventional HTML "get" request and/or a specialized query as understood by one having ordinary skill in the art. Following the request, in step 404, the surrogate proxy server 102 receives the requested foveated image or document from the foveating proxy server 101 (step 405). Upon the receipt of the document or image, the surrogate proxy server 102 can record the document or image in its storage device 111. Thereafter, the surrogate proxy server 102 can perform step 403 whereby the surrogate proxy server 102 transmits the foveated document or image to the client computer 103. After step 403, the surrogate proxy server 102 can receive another request from the client computer 103 or a different request from another client computer 103. When all requests for the images and/or documents have been addressed, the processing shown in FIG. 4 is completed.

Figure 5:
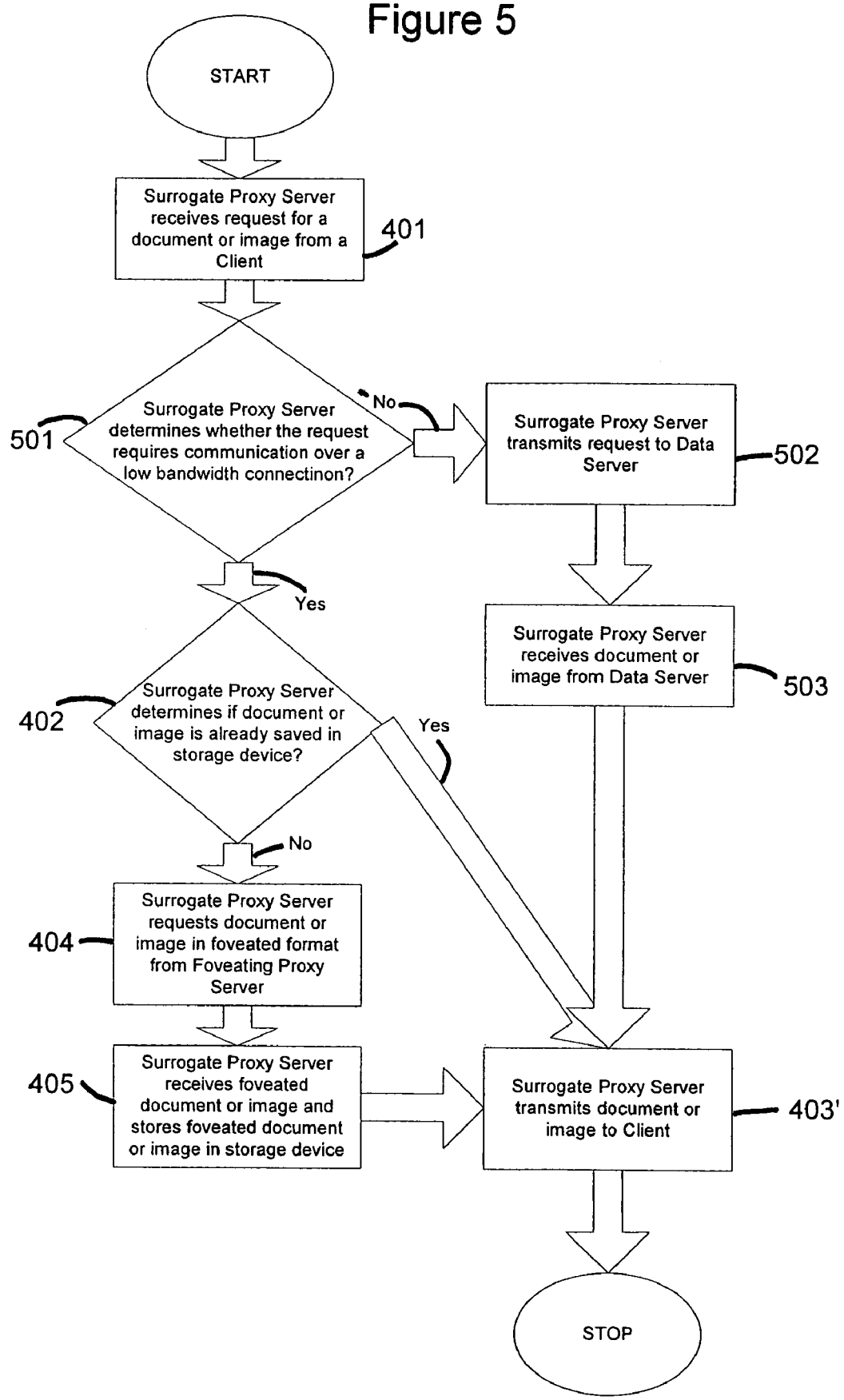
FIG. 5 is a second exemplary flowchart of the method shown in FIG. 4.

FIG. 5 shows a flowchart showing an alternative implementation of the method shown in FIG. 4. In this implementation, after the surrogate proxy server 102 receives a request from the client computer 103 for the foveated image or document, step 501 is provided whereby the surrogate proxy server 102 makes a determination as to the size of the bandwidth required of the communication link between the client computer 103 and the data server 104, based on the cost of obtaining the full image or document from the data server 104 (as the original source of such data). If a sufficient bandwidth is not available, the method shown in FIG. 5 returns to step 602 to determine whether the requested image or document is in the storage device 111' of the surrogate proxy server 102. However, if a sufficient bandwidth is available, in step 502, the surrogate proxy server 102 can request the original image or document from the data server 104. Then, in step 503, the surrogate proxy server 102 receives the image or document from the data server 104, and then transmits the image or documents to the client computer 103 in step 403.

Figure 6:
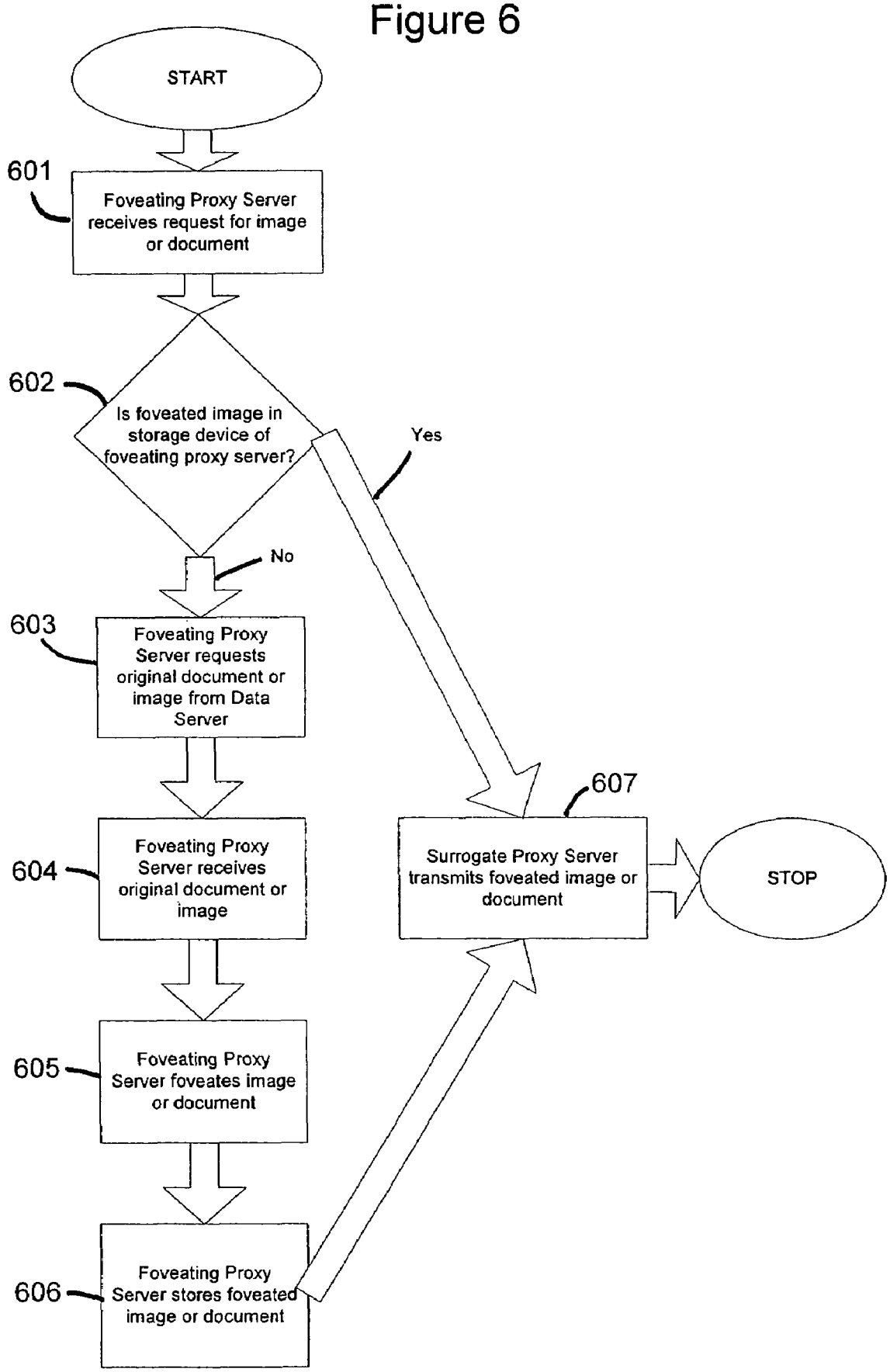
FIG. 6 is a first exemplary flowchart of another variation of the method of the present invention for distributing foveated data packages which can also be executed by the system of FIG. 1.

FIG. 6 shows a flowchart of another embodiment of the method of distributing foveated data from the perspective of the foveating proxy server 101 according to the present invention. In step 601, the foveating proxy server 101 receives a request from the client computer 103 or the surrogate proxy server 102 for the foveated or non-foveated document or image, or for portions thereof. Then, in step 602 (which is similar to step 402), the foveating proxy server 101 determines whether the requested foveated or non-foveated document or image is stored in the storage device 111 of the foveating proxy server 101. Step 602 can be included as a software module of the foveating proxy server 101, or provided as a separate storage management engine (not shown), and execute conventional search techniques to search for a document in a database or dynamic file allocation table.

If the foveating proxy server 101 returns a positive result from its search of the storage device 111, the foveating proxy server 101 transmits the document or image to the requesting client computer 103 or the surrogate proxy server 102 in step 607. If the foveating proxy server 101 returns a negative result from its search of the storage device 111, the foveating proxy server 101 requests the original image or document from the data server 104 where the document or image resides, as indicated by the network address of the requested document or image (step 603). Such request can be a conventional HTML "get" request, or a specialized query. In step 604, the foveating proxy server 101 receives the document or image from the data server 104.

In step 605, the foveating proxy server 101 foveates the document or image according to conventional foveation techniques as known in the art, or as described in U.S. Pat. No. 6,192,114. After step 605, the foveating proxy server 101 can record the original or foveated document or image so as to more quickly satisfy any future requests (step 606). Also, after step 605, the foveating proxy server 101 can transmit the foveated data package (i.e., foveated document or image, or portions thereof) to the requesting client computer 103 or the surrogate proxy server 102 (step 607).

Figure 7:
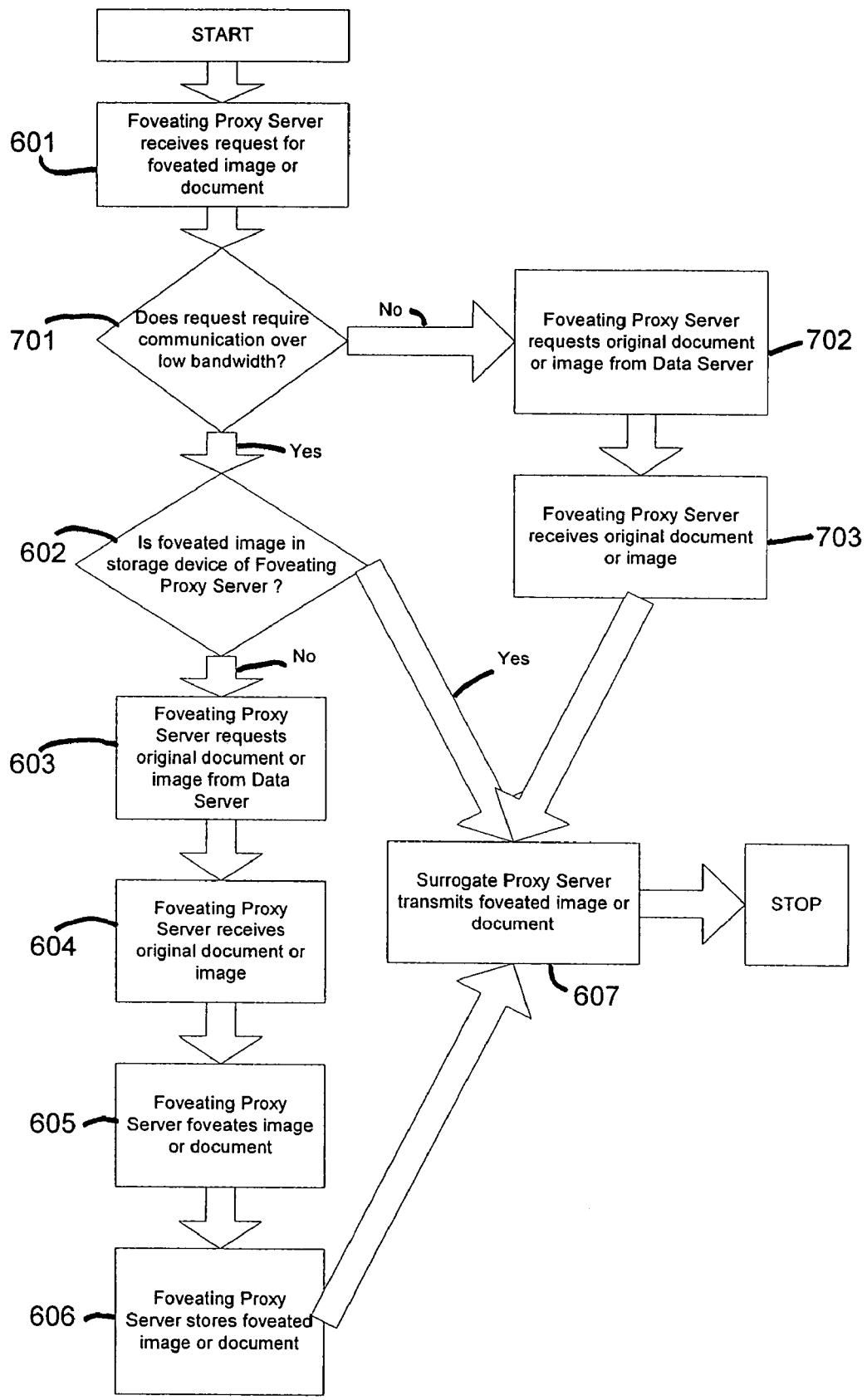
FIG. 7 is a second exemplary flowchart of the method shown in FIG. 6.

FIG. 7 shows a flowchart providing an alternative implementation of the method shown in FIG. 6. In this implementation, after the foveating proxy server 101 receives a request for an image or document, in step 701, the foveating proxy server 101 makes a determination as to the bandwidth of the communication link between the client computer 103 (or the surrogate proxy server 102) and the data server 104, as well as the cost of obtaining the full image from data server 104 as the original image source. If sufficient bandwidth is not available, the method can return to step 602 to determine whether the requested image or document is in the storage device 111 of the foveating proxy server 101. If sufficient bandwidth is available, the foveating proxy server 101 can request the original image or document from the data server 104 in step 702. Accordingly, in step 703, the foveating proxy server 101 receives the image or document from the data server 104. Thereafter, the image can be transmitted to the client computer 103 in step 607.

Figure 8:
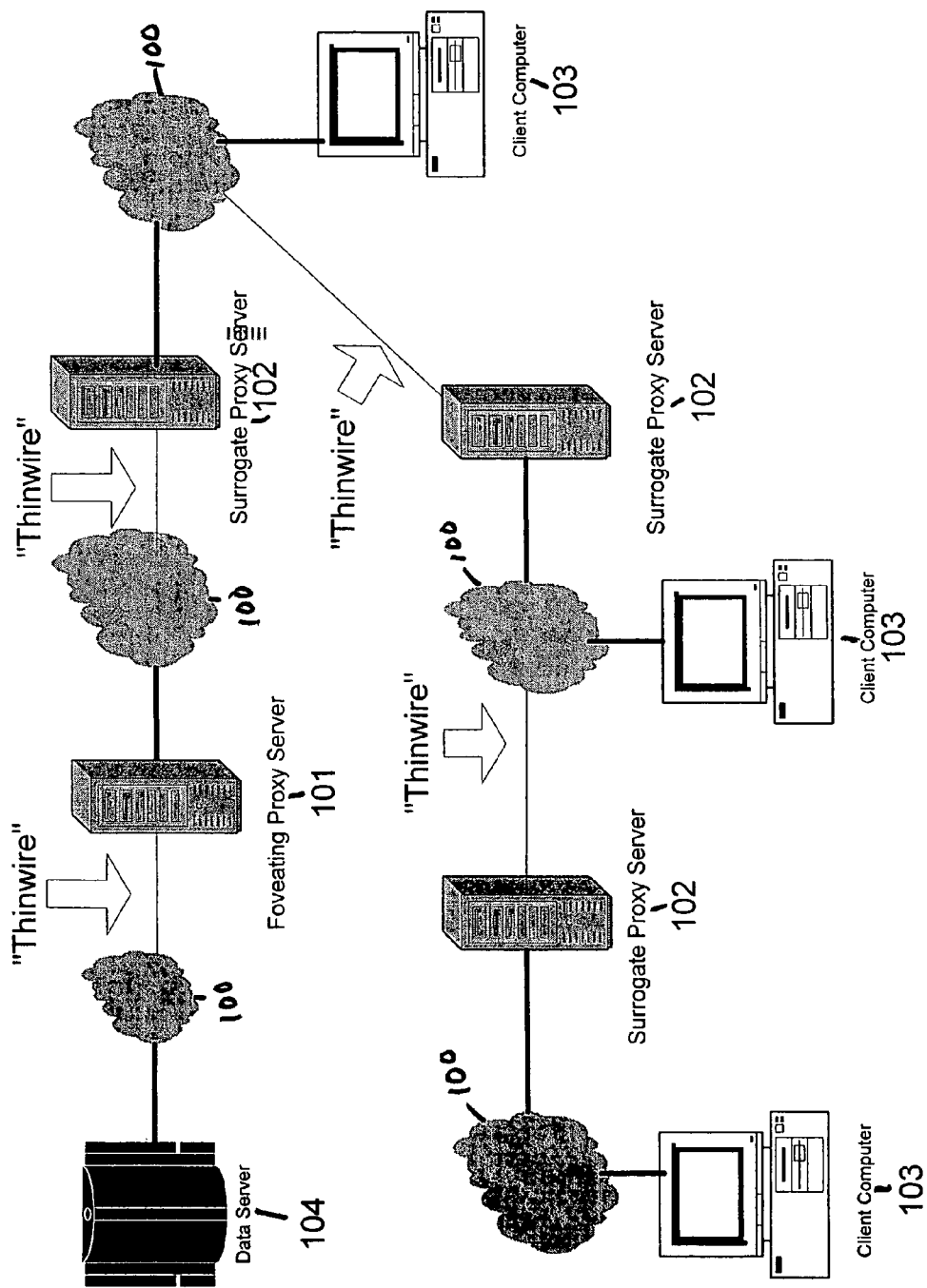
FIG. 8 is another embodiment of the system according to the present invention.

FIG. 8 shows an exemplary implementation of the foveating proxy server 101, and at least two surrogate proxy servers 102 provided on a multi-hop network. As shown in FIG. 8, more than one surrogate proxy servers 102 can be cascaded along the multi-hop portion of a network, where more than one thinwire sections may require multiple proxy servers to provide a greater transmission efficiency.

The invention has been described in connection with certain preferred embodiments. It will be appreciated that those skilled in the art can modify such embodiments without departing from the scope and spirit of the invention that is set forth in the appended claims. Accordingly, these descriptions are to be construed as illustrative only and are for the purpose of enabling those skilled in the art with the knowledge needed for carrying out the best mode of the invention. The exclusive use of all modifications and equivalents are reserved as covered by the present description and are understood to be within the scope of the appended claims.

The invention claimed is:

1. A surrogate proxy arrangement for executing a computer program in a network which has thereon a foveating proxy server and a client computer, comprising:
    a processor which, when executing the computer program, is programmed to:
        receive a request for a data package containing a requested image from the client computer,
        request at least one of (i) at least one foveated image or (ii) a foveated data package containing the at least one foveated image from the foveatinq proxy server,
        receive the at least one foveated image or the foveated data package from at least one of the foveating proxy server or a further device that is connected to the foveating proxy server, wherein the foveating proxy server generates the at least one foveated image, and
        transmit the at least one foveated image or the foveated data package to at least one of the client computer or another device; and
    a rewriting engine which converts the data package into the foveated data package, wherein the rewriting engine is configured to rewrite the data package by replacing references to conventional inlined images with references to the at least one foveated imaqe stored on the foveatinq proxy server, and wherein the foveated data package includes at least a portion of the data package.

2. The surrogate proxy arrangement according to claim 1, wherein the data package is an HTML document.

3. The surrogate proxy arrangement according to claim 1, wherein, when executing the computer program, the processor is programmed to communicate with the foveating proxy server according to a multiplexed protocol.

4. The surrogate proxy arrangement according to claim 1, further comprising:
    an image foveating engine which foveates the requested images into the at least one foveated image.

5. The surrogate proxy arrangement according to claim 1, wherein, when executing the computer program, the processor is programmed to receive a request for an image from the client computer; and access a storage device to determine if at least one foveated image is stored thereon.

6. The surrogate proxy arrangement according to claim 5, wherein, when executing the computer program, the processor is programmed to request the foveated image if the foveated image is not stored in the storage device.

7. The surrogate proxy arrangement according to claim 1, wherein, when executing the computer program, the processor is programmed to:
    receive a request for a data package containing the requested image from the client computer and obtain the data package,
    rewrite the data package as a foveated data package, and transmit the foveated data package to the client computer.

8. The surrogate proxy arrangement according to claim 1, wherein, when executing the computer program, the processor is programmed to:
    receive a request for an image from the client computer and obtain the image,
    rewrite the image as the foveated image, and transmit the foveated image to the client computer.

9. The surrogate proxy arrangement according to claim 1, further comprising a storage device wherein, when executing the computer program, the processor maintains the at least one of the foveated data package and foveated image in the storage device.

10. The surrogate proxy arrangement according to claim 1, wherein the client computer communicates with the foveating proxy server via a network connection, and wherein, when executing the computer program, the processor is programmed to determine a transmission rate of the network connection and to select a foveating technique to minimize a transmission bandwidth based on the transmission rate.

11. The surrogate proxy arrangement according to claim 1, wherein the foveating proxy server is connected to the network via a thinwire portion of the network.

12. The surrogate proxy arrangement according to claim 1, further comprising at least one additional surrogate proxy arrangement, wherein at least two of the at least one additional surrogate proxy arrangement and the surrogate proxy arrangement are communicating with one another, at least one of the surrogate proxy arrangements communicating with the foveating proxy server, and another one of the surrogate proxy arrangements communicating with at least one of the client computer and a further device, wherein at least two of the surrogate proxy arrangements are cascaded along a multi-hop portion of the network.

13. A foveating system for executing a computer program in a network including a server computer and a client computer, comprising:
    a surrogate proxy arrangement including a processor which, when executing the computer program, is programmed to
        receive at least one foveated image from at least one of the foveating proxy server or a further device that is connected to the foveating proxy server, wherein the foveating proxy server generates the at least one foveated image,
        rewrite a data package containing a requested image as a foveated data package, and
        transmit at least one of (i) the at least one foveated image or (ii) the foveated data package to at least one of the client computer or another device; and
    a rewriting engine which converts the data package into the foveated data package, wherein the rewriting engine is configured to rewrite the data package by replacing references to conventional inlined images with references to the at least one foveated image stored on the foveating proxy server, and wherein the foveated data package includes at least a portion of the data package.

14. A foveating system for executing a computer program in a network including a server computer and a client computer, comprising:
    a foveating proxy server; and
    at least two surrogate proxy servers communicating with one another, at least one of the at least two surrogate proxy servers configured to receive an at least one foveated image from at least one of the foveating proxy server or another device, and another one of the at least two proxy servers configured to transmit the at least one foveated image to at least one of the client computer or a further device, wherein the at least two surrogate proxy servers are cascaded along a multi-hop portion of the network, and wherein the foveating proxy server is configured to transmit at least one of (i) the at least one foveated image or (ii) a foveated data package to at least one of the at least two surrogate proxy servers; nd a rewriting engine which converts the data package into the foveated data package, wherein the rewriting engine is configured to rewrite the data package by replacing references to conventional inlined images with references to the at least one foveated image stored on the foveating proxy server, and wherein the foveated data package includes at least a portion of the data package.

15. The foveating system according to claim 14, wherein each surrogate proxy server comprises a processor which, when executing the computer program, is programmed to:

receive the at least one foveated image from at least one of the foveating proxy server or a further device that is connected to the foveating proxy server, wherein the foveating proxy server generates the at least one foveated image, and transmit the foveated image to at least one of the client computer or a another device.

16. The foveating system according to claim 15, wherein, when executing the computer program, the processor is programmed to:

receive a request for a data package containing the requested image from the client computer, request at least one of the foveated image or a foveated data package containing the foveated image from the foveating proxy server, receive the at least one of the foveated image or the foveated data package from the foveating proxy server, and transmit the at least one of the foveated image or the foveated data package to the client computer.

17. The surrogate proxy arrangement according to claim 16, wherein the data package is an HTML document.

18. The surrogate proxy arrangement according to claim 16, wherein, when executing the computer program, the processor is programmed to communicate with the foveating proxy server according to a multiplexed protocol.

19. The surrogate proxy arrangement according to claim 16, further comprising:

an image foveating engine which foveates images into the at least one foveated image.

20. The surrogate proxy arrangement according to claim 16, wherein, when executing the computer program, the processor is programmed to receive a request for an image from the client computer; and access a storage device to determine if at least one foveated image is stored thereon.

21. The surrogate proxy arrangement according to claim 16, wherein, when executing the computer program, the processor is programmed to request the foveated image if the foveated image is not stored in the storage device.

22. The surrogate proxy arrangement according to claim 16, wherein, when executing the computer program, the processor is programmed to:

receive a request for a data package containing the requested image from the client computer and obtain the data package, rewrite the data package as a foveated data package, and transmit the foveated data package to the client computer.

23. The surrogate proxy arrangement according to claim 16, wherein, when executing the computer program, the processor is programmed to:

receive a request for an image from the client computer and obtain the image, rewrite the image as the foveated image, and transmit the foveated image to the client computer.

24. The surrogate proxy arrangement according to claim 16, further comprising a storage device wherein, when executing the computer program, the processor maintains the at least one of the foveated data package and foveated image in the storage device.

25. The surrogate proxy arrangement according to claim 16, wherein the client computer communicates with the foveating proxy server via a network connection, and wherein, when executing the computer program, the processor is programmed to determine a transmission rate of the network connection and to select a foveating technique to minimize a transmission bandwidth based on the transmission rate.

26. The surrogate proxy arrangement according to claim 16, wherein the processor is connected to the network via a thinwire portion of the network.

27. A method of distributing foveated data packages in a network which has thereon a foveating proxy server and a client computer comprising:

receiving at least one foveated image from at least one of the foveating proxy server or a further device that is connected to the foveating proxy server, wherein the foveating proxy server generates the at least one foveated image;

receiving a request for a data package containing a requested image from the client computer and obtaining the data package;

rewriting the data package as a foveated data package; and transmitting at least one of (i) the at least one foveated image or (ii) the foveated data package to at least one of the client computer or another device, wherein the data package is rewritten by a rewriting engine by replacing references to conventional inlined images with references to the at least one foveated image stored on the foveating proxy server, and wherein the foveated data package includes at least a portion of the data package.

28. The method of distributing foveated data packages according to claim 27, further comprising:

requesting at least one of the foveated image or the foveated data package containing the foveated image from the foveating proxy server; and receiving at least one of the foveated image or the foveated data package from the foveating proxy server.

29. The method of distributing foveated data packages according to claim 28, wherein the data package is an HTML document.

30. The method of distributing foveated data packages according to claim 28 converting at least one data package into the foveated data package.

31. The method of distributing foveated data packages according to claim 28, further comprising foveating the requested image into the at least one foveated image.

32. The method of distributing foveated data packages according to claim 27, further comprising communicating with the foveating proxy server according to a multiplexed protocol.

33. The method of distributing foveated data packages according to claim 27, further comprising receiving a request for an image from the client computer; and accessing a storage device to determine if at least one foveated image is stored thereon.

34. The method of distributing foveated data packages according to claim 27, further comprising requesting the foveated image if the foveated image is not stored in the storage device.

35. The method of distributing foveated data packages according to claim 27, further comprising:
receiving a request for an image from the client computer and obtaining the image; and
rewriting the image as the foveated image, and transmitting the foveated image to the client computer.

36. The method of distributing foveated data packages according to claim 27, further comprising maintaining the at least one of the foveated data package or foveated image in the storage device.

37. The method of distributing foveated data packages according to claim 27, wherein the client computer communicates with the foveating proxy server via a network connection, and further comprising determining a transmission rate of the network connection and selecting a foveating technique to minimize a transmission bandwidth based on the transmission rate.

38. The method of distributing foveated data packages according to claim 27, wherein the surrogate proxy server is connected to the network via a thinwire portion of the network.

39. A method of distributing foveated data packages in a network which has thereon a foveating proxy server and a client computer comprising:
providing a foveating proxy server;
providing at least two surrogate proxy servers communicating with one another, at least one of the at least two surrogate proxy servers configured to receive an at least one foveated image from at least one of the foveating proxy server or another device, and another one of the at least two proxy servers configured to transmit the at least one foveated image to at least one of the client computer or a further device, wherein the at least two surrogate proxy servers are cascaded along a multi-hop portion of the network;
receiving a request for a data package containing a requested image from the client computer and obtaining the data package;
rewriting the data package as a foveated data package; and
transmitting at least one of (i) the at least one foveated image or (ii) the foveated data package to at least one of the client computer or another device, wherein the data package is rewritten by a rewriting engine by replacing references to conventional inlined images with references to the at least one foveated image stored on the foveating proxy server, and wherein the foveated data package includes at least a portion of the data package.

40. A surrogate proxy arrangement for communicating at least one foveated image, which, when executing a computer program, performs the steps comprising of:
(a) receiving a request for a data package containing a requested image from the client computer and obtaining the data package;
(b) receiving the at least one foveated image and at least one foveated data package generated by a foveating proxy server;
(c) rewriting the data package as a foveated data package; and
(d) transmitting at least one of (i) the at least one foveated image or (ii) the at least one foveated data package to at least one of a client computer or a further device, wherein the data package is rewritten by a rewriting engine by replacing references to conventional inlined images with references to the at least one foveated image stored on the foveating proxy server, and wherein the foveated data package includes at least a portion of the data package.

41. The surrogate proxy arrangement according to claim 40, further comprising the step of:
(e) requesting the at least one of the foveated image or the foveated data package containing the at least one foveated image from the foveating proxy server prior to step (a).

42. The surrogate proxy arrangement according to claim 41, wherein the data package is an HTML document.

43. The surrogate proxy arrangement according to claim 41, further comprising the step of:
converting the data package into the foveated data package using the rewriting engine.

44. The surrogate proxy arrangement according to claim 43, further comprising the step of:
foveating the requested images into the at least one foveated image using an image foveating engine.

45. The surrogate proxy arrangement according to claim 40, wherein the receiving step (a) is accomplished using a multiplexed protocol.

46. The surrogate proxy arrangement according to claim 40, further comprising the step of:
(e) accessing a storage device to determine if the at least one foveated image is stored thereon.

47. A method for communicating at least one foveated image comprising the steps of:
(a) receiving a request for a data package containing a requested image from a client computer and obtaining the data package;
(b) rewriting the data package as at least one foveated data package;
(c) receiving the at least one foveated image and the at least one foveated data package generated by a foveating proxy server; and
(d) transmitting at least one of (i) the at least one foveated image or (ii) the at least one foveated data package to at least one of a client computer or a further device, wherein the data package is rewritten by a rewriting engine by replacing references to conventional inlined images with references to the at least one foveated image stored on the foveating proxy server, and wherein the foveated data package includes at least a portion of the data package.

48. The method according to claim 47, further comprising the step of:
(e) requesting the at least one of the foveated image or a foveated data package containing the foveated image from the foveating proxy server prior to step (a).

49. The method according to claim 48, wherein the data package is an HTML document.

50. The method according to claim 48, further comprising the step of:
converting the at least one data package into the foveated data package using the rewriting engine.

51. The method according to claim 50, further comprising the step of:
foveating the requested images into the at least one foveated image using an image foveating engine.

52. The method according to claim 47, wherein step (c) is accomplished using a multiplexed protocol.

53. The method according to claim 47, further comprising the step of:
(e) accessing a storage device to determine if at least one foveated image is stored thereon.

* * * * *